United States Patent [19]

Desjardins

[11] Patent Number: 5,792,355
[45] Date of Patent: Aug. 11, 1998

[54] PROCESS FOR TREATING WASTE WATER

[76] Inventor: Gaétan Desjardins, 552 du Chenal, Repentigny, Canada, J6A 2Z7

[21] Appl. No.: 529,178

[22] Filed: Sep. 15, 1995

[51] Int. Cl.⁶ .................................................. C02F 3/30
[52] U.S. Cl. ........................ 210/605; 210/623; 210/630; 210/631; 210/906; 210/921
[58] Field of Search .................... 210/605, 621–631, 210/903, 906, 921

[56] References Cited

U.S. PATENT DOCUMENTS

| | | | |
|---|---|---|---|
| 3,666,106 | 5/1972 | Green | 210/605 |
| 3,907,672 | 9/1975 | Milne | 210/605 |
| 3,914,164 | 10/1975 | Clark | 210/605 |
| 5,514,278 | 5/1996 | Khudenko | 210/605 |
| 5,534,147 | 7/1996 | Kallenbach et al. | 210/605 |

FOREIGN PATENT DOCUMENTS

| | | |
|---|---|---|
| 824479 | 10/1969 | Canada . |
| 1086434 | 6/1980 | Canada . |
| 1152657 | 8/1983 | Canada . |
| 1198837 | 12/1985 | Canada . |
| 1260633 | 9/1989 | Canada . |
| 2009752 | 8/1990 | Canada . |
| 2033607 | 7/1991 | Canada . |
| 2059811 | 7/1992 | Canada . |
| 2060251 | 7/1992 | Canada . |
| 2062203 | 9/1992 | Canada . |
| 2102797 | 11/1992 | Canada . |
| 2085454 | 6/1993 | Canada . |
| 2096175 | 11/1993 | Canada . |
| 1329959 | 5/1994 | Canada . |
| 2041329 | 5/1994 | Canada . |
| 2102134 | 5/1994 | Canada . |
| 1330603 | 7/1994 | Canada . |
| 2099514 | 1/1995 | Canada . |
| 9104230 | 4/1991 | Japan . |

Primary Examiner—Thomas G. Wyse
Attorney, Agent, or Firm—Robic

[57] ABSTRACT

The process for treating waste water uses the combination of a septic tank operating in series with a biological reactor such as a sequencing batch reactor. In this process, waste water is supplied and accumulated in a septic tank. In the septic tank, the waste water and the settling sludge are biologically treated under anaerobic conditions. A given amount of treated waste water is then transferred from the septic tank into a biological reactor such as a sequencing batch reactor, where it is mixed and aerated. Such a mixing and aerating causes activation of the sludge and clarification of the waste water. The activated sludge in suspension in the liquor is then allowed to settle and an upper layer of clarified water formed above the mixed liquor after the settling period is decanted. The excess activated sludge in the biological reactor may then be removed therefrom and supplied into the septic tank so that the excess sludge be treated by digestion therein. The apparatus used to carry out the above-mentioned process comprises a septic tank provided with a baffle wall defining a first chamber where the sludge may settle and accumulate and where anaerobic fermentation is occurring, and a second treatment chamber where the solids are anaerobically digested. In operation, the waste water may flow from the first chamber to the second chamber by passing through the baffle wall. The apparatus also comprises a biological reactor for further treating the waste water under aerobic condition. A pump is provided for transferring the treated waste water in the septic tank to the biological reactor. This process allows a total treatment of waste water and all sludge for an extended period of time, from 5 to 15 years, without having to remove any byproducts for immediate treatment.

10 Claims, 2 Drawing Sheets

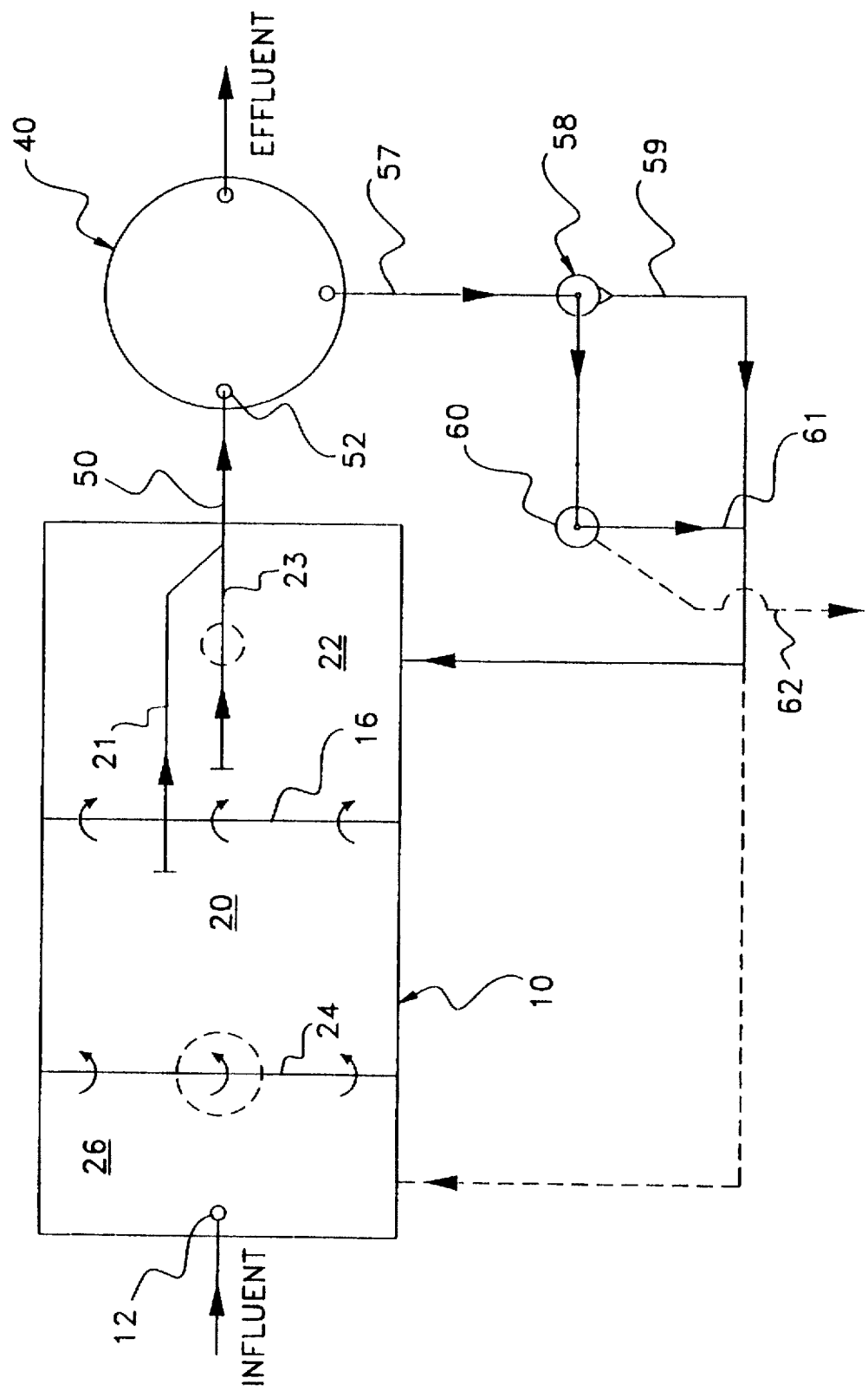

PROCESS FOR TREATING WASTE WATER

FIELD OF THE INVENTION

The present invention relates to a process and an apparatus for treating waste water from houses or dwellings, hotels, restaurants, schools, institutions, factories, commercial buildings, etc. as well as to large housing developments. More particularly, the present invention relates to a system combining a septic tank in series with a biological reactor, preferably a sequencing batch reactor (SBR).

The basic principle of the present invention lies in the fact that it utilizes two already known technologies operating in series in a special way so that the resulting effect provides some outstanding features and benefits as well as very high and reliable biological treatment performance.

These two known technologies are the septic tank technology combined with a biological reactor technology, preferably of the SBR type.

BRIEF DESCRIPTION OF THE PRIOR ART

For the last hundred years, septic tank technology has been developed and used all over the world. It consists of a simple pretreatment with no mechanical maintenance except the fact that the sludge has to be removed therefrom after a certain number of years of utilization. Most of the time, this system works by gravity and allows the settleable solids to be captured and digested anaerobically during two years typically. No screening is necessary. All fibrous materials and inert solids simply settle down in the tank at the same time that the floatable solids are also retained by baffled partition wall(s).

For more stringent water quality, in most of the advanced countries, the septic tank effluent is directed into a gravity aerated tile field to provide a secondary quality water treatment before discharging into the "water table" as final treatment, e.g. percolating through the natural ground.

The tile field constitutes a secondary biological treatment using fixed media process and aerobic bacteria. The pretreated waste water is allowed to percolate through a matrix of aerobic biological film which is fixed and allowed to grow on the surface of a stone bed. This treatment is very similar to the one of an aerobic trickling filter even if the stone bed may be temporarily submerged during the course of its operation, particularly when fed with a syphon or a pump to achieve a more uniform water distribution throughout the entire tile field.

The tile bed activity is also related to a very active biomass growth mixed with the first two or three centimeters of soil. This part of the tile bed is often responsible for most of the waste water treatment and must also remain aerobic.

The septic tank tile field concept has proven to work very well with no maintenance in all cases where adequate conditions exist in terms of flow, solid content, grease content and particularly where the soil conditions and natural water table also meet all requirements for the good operation of such simple installations.

However, one of the main drawbacks of the septic tank tile field installation comes particularly from the solid content load, flow conditions, grease concentration and, of course, from improper soil granulometry or high water table conditions. Today, millions of septic tank tile field installations in each country are totally inadequate and are not working well because the tile field is plugged internally with grease, soil or organic solids or simply because the "water table" has raised and physically submerged the "underground bioreactor" section of the tile bed or because the soil conditions do not permit the proper percolation rate so that the aerobic bacteria cannot absorb the organic before the water is finally discharged into the "water table".

Another drawback with the use of a septic tank in combination with a tile field is the fact that the sludge settling in the septic tank has to be removed regularly to avoid any transfers of sludge to the tile field.

In order to solve these drawbacks, the present invention proposes a combination of a traditional septic tank in series with a biological reactor such as a SBR.

Biological reactors wherein the waste water is aerobically treated are also known in prior art but they are not combined with septic tanks which are also already known in prior art.

More particularly, SBR are known in prior art. SBR reactors are described, by way of example, in Canadian laid-open application no. 2,099,514 and in Canadian patent no. 2,041,329. These documents do not suggest to treat the waste water under anaerobic conditions, as in a septic tank that can accumulate the solids for many years, before treating it in a SBR. The first activated sludge system, such as SBR, was developed using "fill-draw" methodology. SBR technology was reintroduced on the market in the early '80's as a very advanced technology including outstanding biological controls where secondary and tertiary treatment can be achieved in one single tank. In other words, not only can biochemical oxygen demand (BOD) and suspended solids be captured, but nitrogen and phosphorus can also be removed using very specific cyclology in terms of following the actual bacteria activities in a given reactor. These activities can be controlled by a simple timer where anoxic conditions, meaning that no free dissolved oxygen is available except under nitrate form, anaerobic conditions, where no free oxygen is available in the waste water neither under nitrate forms, aerobic conditions and free dissolved oxygen are available in the waste water (with or without the presence of nitrates).

SBR technology is still a technology "on the go" as several groups of searchers are still conducting research work based on all the possibilities offered by such a controllable process where the food quality, the feed modes, the reaction time and the priority of the biological reactions can be controlled.

One of the most interesting advantages of SBR is the fact that it is possible to control the activities of the bacteria as well as its settleability characteristics by using the feed mode. In other words, it is well known today that activated sludge can be separated easily by simple gravity sedimentation if the right kinds of bacteria are encouraged to grow in a given reactor. By rapidly feeding a new batch into a reactor, a very effective "biological selector effect" can be observed. This means that the activated sludge will be separated very efficiently, providing very clear liquid as a treated effluent. Also, this type of feed mode provides several other advantages such as "enhanced kinetics" for the removal rate of organic, which is related to the quantity of organic that the bacteria actually "sees" available for food at a given time in the operating sequence. Such a feed mode and an enhanced kinetics combination allow to save precious time, gaining overall hydraulic and organic treatment capacities.

OBJECTS OF THE INVENTION

A first object of the present invention is to provide a process for treating waste water, which process offers a total treatment of the waste water and the sludge altogether for an extended period of time (5–15 years), without having to remove any by-products for immediate treatment. This sludge handling capacity is called "total sludge management".

Another object of the present invention is to propose a waste water treatment system for use to carry out the process according to the invention.

SUMMARY OF THE INVENTION

In accordance with the invention, the first object listed above is achieved with a process for treating waste water, preferably domestic waste water, comprising the steps of:

a) supplying the waste water to be treated to a septic tank;

b) accumulating the waste water in the septic tank;

c) retaining in the septic tank any scum forming on top of the waste water and allowing any sludge therein to settle;

d) biologically treating the waste water and the sludge in the septic tank under anaerobic conditions;

e) transferring a given amount of the treated waste water from the septic tank into a biological reactor containing a sludge-contained liquor;

f) mixing and aerating the waste water within the biological reactor, such a mixing and aerating causing activation of the sludge and clarification of the waste water;

g) allowing the activated sludge in suspension in the liquor to settle; and h) decanting an upper layer of clarified water formed above the mixed liquor after the settling period.

Preferably, in this process, use is made of a sequencing batch reactor (SBR) as the biological reactor. Moreover, in step e) which, in this case, is occurring simultaneously with step h), the waste water is rapidly transferred to the SBR by separate batches.

Preferably also, the process according to the present invention comprises the additional steps of:

i) removing excess sludge formed in the SBR; and j) transferring into the septic tank the excess sludge removed from the SBR so that the excess sludge be treated in the septic tank by anaerobic digestion.

In accordance with the invention, there is also provided a system for use to treat waste water according to the process mentioned hereinbefore. This waste water treatment system comprises a septic tank for accumulating waste water and wherein scum is forming on top of the waste water and sludge is settling down and accumulates in the tank. The waste water and sludge are biologically treated under anaerobic conditions in the septic tank. The septic tank comprises means for retaining the scum forming therein. The waste water treatment system also comprises a biological reactor for further treating the waste water under aerobic conditions. The reactor contains a sludge-contained liquor and comprises means for mixing and aerating the waste water within the reactor such a mixing and aerating causing activation of the sludge and clarification of the waste water. The reactor also comprises means for decanting an upper layer of clarified water formed above the mixed liquor after a settling period following the mixing and aerating of waste water. Means for removing excess sludge forming therein is also provided and means for transferring the treated waste water from the septic tank to the biological reactor.

Preferably, the septic tank according to the invention comprises a baffle wall extending upwardly from a floor of the septic tank. The baffle wall defines a first chamber where the sludge may settle and accumulate and where anaerobic fermentation is occurring. The baffle wall also defines a second treatment chamber where the waste water is anaerobically digested. In use, the waste water is flowing from the first chamber to the second chamber by passing over the baffle wall.

Preferably also, the transferring means of the treatment system is devised for selectively transferring the treated waste water from the first or the second chamber of the septic tank to the biological reactor.

As can now be understood, the process and treatment system according to the present invention is advantageous in that it solves the problems mentioned hereinbefore, associated with the existing septic tank/tile field installations, by replacing the tile field element with a biological reactor. Advantageously also, with this process, the sludge settling in the septic tank does not require to be removed for five to fifteen years.

BRIEF DESCRIPTION OF THE DRAWINGS

The invention and the way it works will be better understood upon reading of the following, more detailed but non-restrictive description thereof given with reference to the accompanying drawings in which:

FIG. 2 is a schematic block diagram of the process according to the invention.

Figure 1:
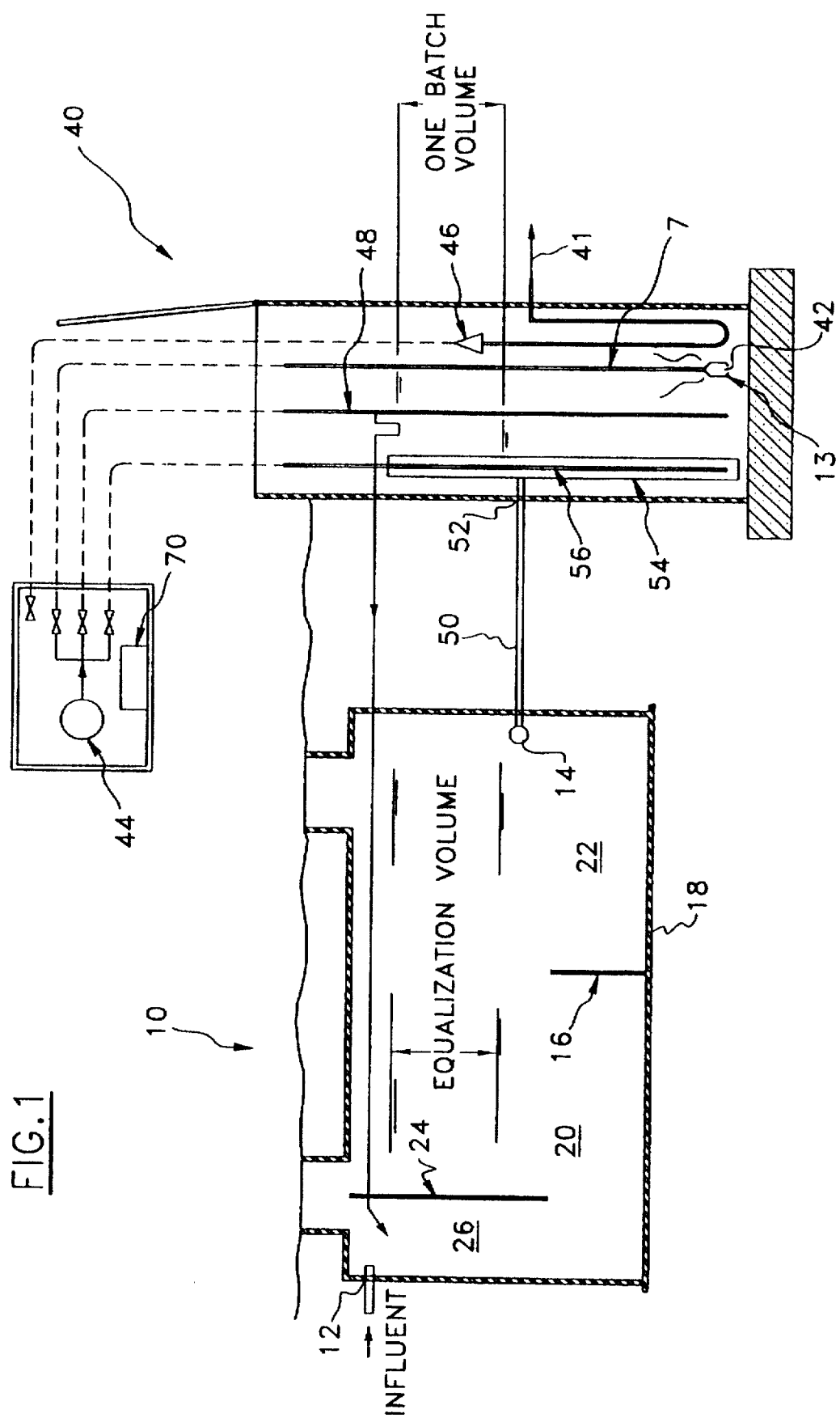
FIG. 1 is a side elevational view of a waste water treatment system adapted to carry out the process according to the invention.

DETAILED DESCRIPTION OF A PREFERRED EMBODIMENT OF THE TREATMENT SYSTEM ACCORDING TO THE INVENTION

Referring to FIG. 1, the treatment system according to the present invention basically comprises a modified septic tank 10 followed by a biological reactor 40, preferably a SBR treatment reactor. The treatment system also comprises transferring means for transferring the waste water from the septic tank 10 into the biological reactor 40. These two technologies interact with each other to form the global process according to the present invention. For the purpose of simplifying the following description, this process will be called "BioCycle".

The BioCycle system is designed to solve the problems associated with septic tank/tile field existing installations by replacing the tile field element with one SBR reactor. Also, the BioCycle system can be designed for new installations using a specially engineered septic tank technology followed by a rapid batch feed SBR technology.

Septic tank

As illustrated in FIG. 1, the septic tank 10 comprises an inlet 12 for receiving the influent of the waste water and an outlet 14 from which the water treated in the septic tank 10 is evacuated. The septic tank 10 further comprises a baffle wall 16 extending upwardly from the floor 18 of the septic tank 10. The baffle wall 16 defines a first treatment chamber 20 where the sludge may settle and accumulate and where anaerobic fermentation is occurring and a second treatment chamber 22 where the waste water and the settleable solids are anaerobically digested. In use, the waste water is flowing from the first chamber 20 to the second chamber 22 by passing over the baffle wall 16.

A grease baffle wall 24 is provided. It defines a grease trap chamber 26 to accumulate the non-emulsified grease content and most of the floating material present in the waste water influent. This chamber 26 is located at the front end of the septic tank 10. The grease baffle wall 24 is provided over a much more extended vertical distance towards the floor 18 of the tank 10 as in a normal septic tank to reflect an equalization function of the tank 10 as it will be further discussed hereinafter. The extension of the grease baffle wall 24 is sufficient to capture and store the floating material, scum and grease, even when the water level falls to its minimum level in the tank 10.

As mentioned hereinbefore, the remaining portion of the septic tank 10 downstream the grease baffle wall 24, is separated by an intermediate baffle wall 16 extending from the floor 18 of the tank 10. This intermediate baffle wall 16 defines the two treatment chambers 20, 22. As it will be further discussed, this baffle wall 16 separates the acidogenic fermentation from the methanogenic digestion. This wall 16 is also very important as it will promote an early accumulation of the solids into this first chamber 20 acting as an anaerobic fermenter. As the solids accumulate, their concentration also increases much more rapidly in this chamber 20 (4–7% dry solid content). Such high concentration of microorganisms enhances the fermentation reaction.

Preferably, the middle baffle wall 16 has an elevation equivalent to close to 50% of the total water depth and will correspond to the invert elevation of the effluent port of the tank 10 toward the SBR 40. Its elevation can vary slightly. It depends on the calculation of the accumulation of solids and on the equalization capacity required. The location and elevation of the baffle wall 16 of this preferred embodiment allows to improve the process and simplify the structural construction of the septic tank 10.

The second treatment chamber 22 is solely used for further digestion, preferably methanogenic digestion, and accumulation of the solids.

As illustrated in FIG. 1, the septic tank 10 is preferably designed so that the entire surface area of the tank 10 including each of the chambers 20, 22, can be used for hydraulic equalization capacity.

Preferably also, the septic tank 10 is also designed to handle very important scum accumulation. As the system is built in view of the accumulation of solids over 5–15 years, the septic tank 10 is designed to accept an important volume of floating solids over the whole septic tank 10 surface including each of the chambers 20, 22.

Biological reactor

The SBR 40 used to treat the waste water under aerobic condition contains a sludge-contained liquor (not illustrated). The SBR 40 comprises an air diffuser system 42 for aerating and mixing the waste water within the reactor 40. As illustrated in FIG. 1, the air diffuser 42 is connected to an air blower 44 located outside the SBR 40. Such a mixing and aerating causes activation of the sludge and clarification of the waste water. Any other means for mixing and aerating the waste water known in the art such as any means selected from the group consisting of jet aerators, air diffusers, submerged turbines and mechanical mixers, may be used.

The SBR 40 also comprises a syphon decanter 46 for decanting an upper layer of clarified water 41 formed above the mixed liquor after a settling period following the mixing and aeration of waste water. Alternatively, the decantation means of the SBR 40 may be fixedly mounted inside the SBR at a given height, hereinafter called "clear water level", and in and through which the upper layer of clarified water on top of the liquor within the SBR may freely enter and be discharged out. Other fixed or floating decanters may also be supplied.

Means for removing excess sludge forming in the SBR 40 are also provided. This means comprises an air-lift pump 48 also connected to the air blower 44. This air-lift can also be replaced by another pumping device.

As mentioned before and referring to FIGS. 1 and 2, the treatment system is also provided with means for transferring the waste water from the septic tank 10 to the SBR. Preferably, this transferring means is designed for selectively transferring the treated waste water from the first or the second chamber 20, 22 of the septic tank, as it is schematically illustrated in FIG. 2. The transferring means may easily comprise a first pipe 21 having an inlet for receiving the waste water from the first chamber 20 and a second pipe 23 having an inlet for receiving the waste water from the second chamber 22. Each of the first and second pipe 21, 23 has an outlet connected directly to a separate transfer device or to a valve which is connected to an inlet of a third pipe 50. This third pipe 50 has an outlet connected to an inlet 52 of the biological reactor. This transferring means also comprises pumping or transfer means for pumping the waste water from the septic tank 10 into the biological reactor 40 through the first or second pipe and the third pipe. Preferably, as illustrated in FIG. 1, this pumping means is designed for rapidly introducing waste water into the SBR, such a rapid introduction causing the level of the liquor within the SBR reactor to raise from a bottom water level (BWL) to a top water level (TWL) and to be lowered back to the BWL once the waste water has been treated using the syphon canter 46. The waste water is then discharged out of the SBR.

This pumping means comprises a vertical liquid transfer tube 54 enclosed in the SBR 40 and in open communication with the inlet 52 of the SBR 40 for monitoring the waste water level of the septic tank 10 without having to access the septic tank 10. Another airlift transfer pump 56 enclosed in the vertical tube 54 is also provided for transferring the water from the septic tank 10 to the SBR. This special vertical liquid transfer tube 54 connects the septic tank liquid 10 to the interior of the biological reactor 40. Such a tube 54 forms a sealed vertical compartment in direct communication with the liquid in the septic tank 10. This transfer tube 54 has dimensions sufficient for monitoring the liquid level of the septic tank 10 directly without having to access the septic tank. Also, it can be used to install an airlift transfer pump 56 or other pump to actually transfer the liquid from the septic tank 10 to the biological reactor 40. This transfer tube 54 is then designed with sufficient vertical length to provide the necessary submergence for efficient operation of the airlift pump 56. Alternatively, the air-lift pump 56 can be economically incorporated into a transfer tube 54 installed between the septic tank 10 and the SBR 40 to enable the rapid transfer of each waste water batch from the septic tank 10 to the SBR. The air-lift transfer pump 56 may use the blower 44 provided for the aeration of the SBR 40.

Preferably, as illustrated in FIG. 2, the treatment system may advantageously comprise a phosphorus release tank 58 for removing phosphorus contained in the excess sludge from the SBR when required. Obviously, with this alternative, any means known in the art for transferring the excess sludge from the SBR 40 into the release phosphorus tank 58 and the treated excess sludge from the release tank 58 into the septic tank 10 is also provided.

Preferably also, another air-lift pump (not illustrated) may be provided for transferring the last amount of treated water back to the inlet of the biological reactor tank during extended "no-flow" periods towards the influent of the septic tank 10.

DESCRIPTION OF A PREFERRED EMBODIMENT OF THE PROCESS ACCORDING TO THE INVENTION

In the BioCycle process according to the present invention, the septic tank 10 is utilized in a very special way described in the following sections.

1-Equalization of all flow and organic

Using a pumping station 56 for transferring the waste water from the septic tank 10 to the SBR reactor 40, the septic tank 10 is used as an equalization tank in which the water level will vary according to the frequency of operation of the pumping device and the incoming raw sewage rates. The BioCycle process preferably utilizes a "rapid batch feed" operation mode where every batch of waste water is pumped out quickly from the septic tank 10 into the SBR 40 reactor (typically within 5 to 30 minutes maximum).

The septic tank 10 equalizes all the hydraulic loads so that no hydraulic peak flow can disturb the SBR final treatment system. Obviously, by doing so, all organic peak loads are also equalized into the same septic tank 10. Furthermore, the SBR final treatment is also protected from organic concentration, toxic concentration, detergent concentration and other physical and chemical effects such as pH and temperature variations. Anaerobic biomass is very resistant to these perturbations and acts as an efficient protection for the final aerobic treatment.

The septic tank 10 is acting as a low rate anaerobic digester combining organic and hydraulic equalization capacities from which is fed a biological reactor, preferably a SBR aerobic reactor system using a rapid-batch waste water introduction mode.

The septic tank 10, as a low rate anaerobic digester, is capable of transforming the complex organics contained in the waste water into simple ones such as fatty acid compounds readily biodegradable by the anaerobic methane bacteria present in the septic tank 10 and by the aerobic bacteria, present in the following SBR reactor 40. The fermenter concept is quite special in many ways. In this sense, it does not use any external means of mixing the content other than the flow velocities. Also, the sludge detention time or sludge age of the fermentative biomass is normally controlled by the height of the division baffle wall between the fermenter compartment and the digester compartment. For additional control on the sludge age, different withdrawal points can be installed along the waste water path (circuit) in the septic tank so that the waste water can be transferred sooner to the SBR aerobic reactor.

2-Compartmented degreaser

The SBR reactor 40 cannot likely get plugged with grease or solids like a tile bed. But, considering potential grease content in the waste water, the BioCycle process makes use of a degreaser baffle wall 24 ahead of the septic tank 10 to form a grease trap chamber 26 in the septic tank 10. This grease trap chamber 26 is also accessible to remove the excess of floating material from an access manhole when required.

3-Fibrous and inert material removal and elimination

All fibrous solids such as paper, cloth and other inorganic/ inert solids simply settle down and accumulate into the septic tank 10 without requiring any mechanical equipment, eliminating all associated maintenance and operation. These solids are eliminated to a substantial degree due to a very long digestion time allowed and some natural resolubilization reactions.

4-Removal and elimination of organic solids

The settleable part of the organic solids settles down into the septic tank 10. These solids will also be digested in a very effective manner and the rest will accumulate at a certain rate, depending on the waste water temperature which will affect the anaerobic digestion of the solids. The digested part of these solids will disappear from the tank and will, therefore, be eliminated under water, $CO_2$, $CH_4$ and $H_2S$ gas form, therefore reducing significantly the solid weights and their effective volume being actually accumulated.

5-Anaerobic treatment

Anaerobic treatment occurs in the septic tank 10. Such treatment can be decomposed into two main phases.

Fermentation of organics

The first phase is called "fermentation" and consists of an acidogenic transformation of the organic solids which are mainly converted into "fatty acid compounds" such as acetates, butyrates and propionates organic forms. Such organic forms represent the simplest organic material which will be available later on for storage and/or absorption by either the aerobic microorganisms or by anaerobic (methane) bacteria. As preferred intention of this process, these fatty acids are to be first stored and then absorbed by the aerobic biomass contained in the SBR, particularly when biological phosphorus removal is required. The fermentation process is a transformation process only. It does not reduce the organic load of the waste water.

Methanogenic digestion

This is the second stage of the anaerobic treatment where the organics are digested.

During the following methanogenic digestion phase, the BOD load will be reduced as the organic is used by the anaerobic methane bacteria for their own growth and is transformed mainly into $CH_4$ and $CO_2$ gas. BOD is, therefore, reduced typically by 35% to 80% depending mainly on detention time, anaerobic (methane) bacteria population and the reactor content temperature.

The process uses the anaerobic treatment in a controlled way, depending on the effluent quality required. In other words, when biological phosphorus removal is required, the effective detention time of the waste water through the septic tank will be controlled so that a sufficient quantity of fatty acids still be contained in the waste water before proceeding to the sequencing batch reactor. This control is simply realized by repositioning the effluent withdrawal point towards the entrance of the septic tank 10 instead of towards the normal effluent end of the tank 10, when maximum BOD reduction/without phosphorus removal is required. In this case, the second half of the tank is simply used as accumulation and digestion of solids.

When no biological phosphorus removal is required, then, the effluent of the septic tank 10 is positioned at the further end of the septic tank 10 so that the waste water fully travels across the tank 10 to achieve its maximum detention time. In doing so, the process requirement is only to achieve a maximum reduction of the BOD loading to ultimately save energy, as it is no longer concerned with the conservation of a sufficient quantity of fatty acids to obtain biological phosphorus removal in the sequencing batch reactor. Clearly, these fatty acids are then consumed by the anaerobic methane bacteria resulting in the organic load reduction.

The process preferably uses a septic tank with a "hydraulic plug flow" configuration so that each physical and biological reaction can be achieved following a priority order dictated by the prevailing conditions along the liquid course as it travels across the septic tank 10. This hydraulic plug flow is achieved by using a septic tank 10 as described hereinbefore.

6-Biological phosphorus removal

As explained hereinbefore, a preferred embodiment of the present invention addresses to biological phosphorus removal. Several different biological phosphorus removal systems exist on the market today. They are all based on an early creation of "fatty acid compounds" generated in a prefermentation reaction prior to another anaerobic/aerobic reacting phase. The efficiency of biological phosphorus removal will directly depend on the quantity of fatty acids generated in the prefermented phase and not destroyed by other micro-organisms before the aerobic phosphorus removal bacteria can store them during an anaerobic period and absorb them later on during an aerobic period.

The principle of operation can be resumed as follows. First, organic matter has to go through the first stage of anaerobic treatment called "fermentation". This phase consists of acidogenic transformation of the organic into fatty acids. These fatty acid compounds represent the most easily biodegradable organic available to the bacteria. Such compounds can be readily "stored" by the phosphorus removal bacteria under anaerobic conditions e.g. without requiring oxygen as the energy source. The energy source used by the bacteria to proceed with this storage is the bacteria polyphosphate intracellular reserve. So, the bacteria will release their polyphosphate content as they will accept and store a proportional quantity of fatty acids (select-food). At that stage, the bacteria do not absorb/use/digest or consume any of this "select-food". When the fatty acids have been completely stored, the aeration system can then be started. Under oxygenated conditions, the phosphorus removal bacteria will start to consume the previously stored fatty acids. As they do so, they will begin to recapture their polyphosphates previously released in the waste water in order to basically tend to keep a stable energy level inside their cells. So, with a very efficient fermentation, sufficient fatty acid compounds can be generated to permit very large quantities of phosphorus to be reabsorbed by the biomass, in excess of their synthesis needs for reproduction.

In other words, in the septic tank 10, fatty acid compounds are generated through the acidogenesis fermentation stage. Such fatty acid is to be later on stored by the phosphorus removal bacteria present in the biological reactor biomass during the anaerobic period of the engineered treatment sequence. During this stage of treatment, the fatty acid compounds are first "stored" in the bacteria permanently. The energy used for such anaerobic reaction is the release of the polyphosphates from the bacteria back in the mixed liquor. When the oxygen is later on available to these bacteria, the fatty acids are then consumed by the bacteria. At the same time, the bacteria reabsorb its polyphosphates previously released plus important additional quantities if sufficient fatty acids have been stored in the bacteria previously. This way, very important quantities of polyphosphates can be reaccumulated into the phosphorus removal bacteria and very efficient phosphorus removal can be achieved biologically without the use of chemicals.

Thanks to the present invention, release of phosphorus backed in the waste water is avoided when the excess sludge, rich in phosphorus content, will be returned eventually to the front end of the septic tank 10 for further anaerobic treatment. During the digestion of these solids under anaerobic conditions, the phosphorus would again be resolubilized, eliminating therefore the effectiveness of the biological phosphorus removal process as the phosphorus would be reinjected into the waste water being treated.

The present invention overcomes this obvious problem by promoting an early phosphorus release from the phosphorus-rich wasted sludge 57 into a phosphorus release tank (PRT) 58 installed beside the septic tank 10 and the SBR reactor 40. So, the excess wasted sludge from the SBR reactor 40 is first directed into the PRT phosphorus release tank 58. The pump transfer energy is simply used as a gentle mixing to provide an efficient reaction. Then the sludge is allowed to settle down under anoxic and further anaerobic conditions. Therefore, phosphorus will be released back into the water content over a controllable period of time. As the wasted sludge is admitted in the form of several batches per day, sufficient mixing is provided in the PRT 58 to separate the phosphorus from the biological settling solids. The PRT 58 is designed to encourage the release of the phosphorus from the bacteria to the water content over anaerobic/static conditions. This operation is done as a batch process using a sequence in which the inlet flow velocity is used to provide the necessary energy to control the uniformity of the reaction. The phosphorus-free sludge is then separated by gravity sedimentation. After this reaction is completed, then the supernatant water, rich in phosphorus, is decanted and may be directed into a short tile field or an absorption trench for phosphorus absorption by the soil, as is the case for the standard septic tank/tile field technology. As the wasted sludge only represents 1–5% of the total influent, the quantity of water to dispose of in the tile field is quite small. Therefore, the tile field itself can be built quite compact and without important expenses. Alternatively, the phosphorus could be recovered through a filtration process 60 utilizing "peat moss" as an absorbent. As the natural soil and the peat moss absorb 10–35% of the total phosphorus content, another media can be used called "LECA™"(special clay product) which can retain almost 100% of the phosphorus. Of course, these media must be replaced when saturated. They can be disposed of for gardening, as fertilizers 62. The phosphorus-free sludge 59 from the PRT and the phosphorus-free water 61 from the filtration process 60 may be transferred back to the septic tank 10. Alumina can also be used as a very effective phosphorus exchanger for this purpose.

This allows the phosphorus to be removed biologically right until the end of the process while all the sludge produced by the process can be eventually digested completely without causing any process interference.

7-Maintaining efficient treatment during extended periods without flow

In the event of long periods of flow or influent interruption, the present invention offers a unique advantage as it can basically utilize all the organic material stored in the septic tank 10 in order to eventually feed the SBR reactors 40 on a daily basis. This way, the SBR reactor 40 can be kept in good operating condition for weeks and months even if the interruption of the incoming flow to the septic tank 10 is for extended periods of time such as in work camps, schools, hotels, etc.

Preferably, the process according to the present invention can be reduced to practice as follows.

The operation of the treatment plant may be managed by logic controls 70 or more sophisticated electrical controls. When the equalization capacity provided in the septic tank 10 has been exhausted, the controls will acknowledge this situation and will automatically/continuously recirculate the last treated water batch(es) back to the septic tank influent. Therefore, this quantity of water will automatically generate a permanent available source of waste water for the aerobic final treatment as long as organics are present in the septic tank 10 for resolubilization in the water being recirculated. In another preferred embodiment of the present invention, the plant may also be managed by manual control but for more efficiency, a sophisticated control is favoured.

In other words, the septic tank 10 may be used for storing an enormous quantity of organics that can be used totally or partially to feed a conventional bio-reactor, an activated sludge process, preferably an SBR aerobic reactor, during long and even very extended periods of time where the flow is completely interrupted at the influent end of the BioCycle treatment plant, for example in schools, factories in industrial parks, work camps, hotels, hospitals, etc. During such periods, the system may be controlled by the "logic command" and the last batch of treated water is recycled ahead of the septic tank 10 influent, in case of a SBR system, instead of being discharged to the normal receiving effluent stream. This last quantity of water enables the biological reactor 40 to be fed daily at the desirable rate, regardless of the "no flow" conditions. In case of a continuous flow system, the logic controls sense the flow signal and initial a minimum flow recirculation from the final clarifier back to the septic tank 40 influent.

Using the same logic controls, the septic tank is also reactivated at the end of every cycle when the excess sludge is eventually transferred from the aerobic SBR reactor to the septic tank. This amount of sludge represents a valuable amount of organic matter available to feed the anaerobic reactor (septic tank) even during the extended "no flow" periods. Alternatively, during extended periods without flow, the process in the SBR may be restricted to the mixing and aerating step. In this case, the septic tank is reactivated and fed with waste water from the SBR which has not gone through settling and decanting steps.

8-Extended sludge management

The present invention also offers another great advantage by allowing to manage all the generated sludge for extended period of time. This advantage of the invention is as far as its capacity to manage all generated sludge in the complete BioCycle system (anaerobic and aerobic) for extended periods of time. Preferably, this system could be designed so that all sludge could be accumulated in the septic tank 10 for periods ranging from 5, 10 and up to 15 years without having to remove the sludge from the septic tank 10.

The septic tank 10 may receive all sludge from primary clarification and from the excess sludge generation from the secondary aerobic system, the SBR 40. It then acts as a primary clarifier, scum removal and a digester tank at the same time.

As the present invention uses a very long sludge detention time, the sludge accumulation cannot be calculated using conventional "model" (equations for calculation) as conventional treatment plants utilize a sludge detention time of 5–90 days typically, including digestion.

Under a very long sludge detention time, several other reactions occur and will furthermore reduce the quantity of sludge that will actually accumulate in the septic tank 10. These reactions greatly affect every form of solids present, as follows:

Anaerobic digestion of biodegradable volatile solids.

Of course, this part of the solids represents the truly biodegradable organic solids and is, therefore, almost completely digested within the first months of operation, depending on the water temperature in the tank. This portion is, therefore, readily/mostly transformed under gas form and, consequently, is not occupying any significant volume in the septic tank 10 after a few years of operation.

Anaerobic digestion of non biodegradable volatile solids

These solids are mostly the fibrous material, paper, cloth, hair, nails, etc. By standard definition, these solids cannot be biodegraded, e.g. during a conventional 5–90 days of solids detention time, including the digestion time. But, as the present invention preferably utilizes much longer detention time e.g. 5, 10 and up to 15 years of sludge detention time, the non biodegradable solids are transformed into biodegradable volatile solids and, therefore, are fully digested and are not occupying a significant volume in the septic tank also.

Removal/reduction of the inert material.

Inert material content is quite important in domestic waste water. It can be accounted for 10–30% of the total solids with a normal average value of 20%. These solids are referred to as the salts, the soil, the sand, some polymer products, etc. Also, by standard definition, these solids directly accumulate without any reduction in volume as, in standard sewage plants, the sludge/solid detention time varies between 5 and 90 days maximum, including the digestion time. Under these conditions, it is true that these kinds of solids cannot disappear. But, in the present invention, as the sludge detention time may vary from 5, 10 and 15 years as stated earlier, the most part of these solids is resolubilized in the water under ionic form or soluble salt such as silicon, calcium, sodium, manganese, magnesium, etc., and is therefore slowly but continuously leaving the treatment plant diluted in the treated effluent without causing any real pollution. Therefore, this important part of the inert does not all directly accumulate in the septic tank neither.

These three basic phenomena explain a low accumulation rate of the solids in the septic tank 10 used according to the present invention.

In brief, a preferred embodiment of the present invention offers a total sludge management system using a septic tank 10 designed according to a mass balance of the solids generated/digested and resolubilized. A self-contained capacity of 5 to 15 years can be realized due to the enhanced digesting and resolubilizing effects over a very long sludge retention time. Such a digestion period is sufficient to largely digest the volatile biodegradable solids as well as the volatile non biodegradable solids, by conventional definition. Also, this total sludge management capacity is greatly assisted by the resolubilization of the inert material leaving the septic tank 10 and the biological reactor daily in the form of ionic compounds such as salts, etc.

Advantageously, the use of a SBR reactor 40 with a septic tank 10 enhances the treatment capacity using rapid feed of the SBR 40 reactor by means of a pumping device such as electric pump or air lift devices. This rapid feed mode is used to enhance the SBR 40 treatment capacity by using a short filling period and also by promoting maximum biodegradability rates from the bacteria due to the high food to microorganism ratio (F/M) at the beginning of each treatment cycle. Equally important, this "rapid-feed" operation mode also allows for very efficient control of suspended solids of the treated effluent by creating a biological "selector effect" at the beginning of each treatment cycle. Such a selective effect enhances the growth rate of the "floc-forming" bacteria over the "filamentous" bacteria by promoting a very efficient way of feeding/developing the growth of the "floc-forming" bacteria rather than encouraging the growth of the "filamentous" bacteria. The floc-forming bacteria then grows over the filamentous bacteria population, in minority, to form larger floc which will gather the small isolated pinpoint floc during its global sedimentation movement occurring during the settle period of the treatment sequence.

Also, as the SBR reactor is fed rapidly, appreciable time is gained within the actual time sequence. This combined with the enhanced kinetic activities of the bacteria also translates into a gain in the overall treatment capacity of the BioCycle plant.

Although only one preferred embodiment of the invention has been described in detail hereinabove and illustrated in the accompanying drawings, it is to be understood that the invention is not limited to this precise embodiment and that various changes and modifications may be effected therein without departing from the scope or spirit of the invention.

What is claimed is:

1. A process for treating waste water, said process comprising the steps of;
   a) supplying the waste water to be treated to a septic tank;
   b) accumulating the waste water in the septic tank;
   c) retaining in the septic tank any scum forming on top of said waste water and allowing settleable solids therein to settle as sludge;
   d) biologically treating the waste water and the sludge in the septic tank under anaerobic conditions;
   e) transferring a given amount of said treated waste water from the septic tank into a sequencing batch reactor (SBR) containing a sludge-activated liquor;
   f) mixing and aerating the waste water within the biological reactor, such a mixing and aerating causing activation of the sludge and clarification of the waste water;
   g) allowing the activated sludge in suspension in the liquor to settle; and
   h) after step g), decanting an upper layer of clarified water formed above the liquor
   i) removing excess sludge formed in the SBR.

2. The process as claimed in claim 1, comprising the additional step of:
   j) transferring into the septic tank the excess sludge removed from the biological reactor for reactivating and feeding the septic tank and for further treating excess sludge in said septic tank.

3. The process as claimed in claim 2, wherein use is made of a septic tank comprising a baffle wall extending upwardly from a floor of the septic tank, said baffle wall defining a first chamber where the sludge may settle and accumulate and where anaerobic fermentation is occurring, and a second treatment chamber where the waste water is anaerobically digested, and whereby said waste water in the septic tank is flowing from the first chamber to the second chamber by passing over said baffle wall.

4. The process as claimed in claim 3, wherein in step e), the waste water transferred from the septic tank to the SBR is coming from the second chamber.

5. The process as claimed in claim 3, wherein in step e), the waste water transferred from the septic tank to the SBR is coming from the first chamber of the septic tank.

6. The process as claimed in claim 5, comprising the additional step of:
   k) treating the excess sludge removed from the SBR for releasing phosphorus contained in said excess sludge before supplying said excess sludge into the septic tank.

7. The process as claimed in claim 6, wherein the excess sludge removed from the SBR is biologically treated in a phosphorus release tank.

8. The process as claimed in any one of claims 4 to 7, wherein in step c), the scum is retained with an additional baffle wall within the septic tank, said additional baffle wall extending downwardly from a ceiling of the septic tank.

9. The process as claimed in claim 8, wherein during periods of interrupted waste water influent into the septic tank, the supernatant of step h) is recycled back in the septic tank.

10. The process as claimed in claim 1, wherein:
   in step e), the waste water is rapidly transferred to said SBR; and
   steps e) and h) are occurring simultaneously.

* * * * *